United States Patent
Stuckert et al.

(10) Patent No.: US 9,568,310 B2
(45) Date of Patent: Feb. 14, 2017

(54) METHOD AND DEVICE FOR ASCERTAINING A POSITION OF A CAMSHAFT AND A PHASE OF AN INTERNAL COMBUSTION ENGINE

(71) Applicant: Robert Bosch GmbH, Stuttgart (DE)

(72) Inventors: Paul Stuckert, Waiblingen (DE); Ralf Drescher, Korntal-Muenchingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 80 days.

(21) Appl. No.: 14/338,011

(22) Filed: Jul. 22, 2014

(65) Prior Publication Data

US 2015/0020581 A1 Jan. 22, 2015

(30) Foreign Application Priority Data

Jul. 22, 2013 (DE) .................. 10 2013 214 303

(51) Int. Cl.
| | |
|---|---|
| *G01M 15/06* | (2006.01) |
| *G01B 21/22* | (2006.01) |
| *G01B 21/16* | (2006.01) |
| *G01D 5/14* | (2006.01) |
| *F01L 1/02* | (2006.01) |
| *G01D 5/245* | (2006.01) |
| *F01L 1/047* | (2006.01) |
| *F01L 1/053* | (2006.01) |

(52) U.S. Cl.
CPC .............. *G01B 21/22* (2013.01); *F01L 1/02* (2013.01); *F01L 1/022* (2013.01); *F01L 1/026* (2013.01); *G01B 21/16* (2013.01); *G01D 5/147* (2013.01); *G01M 15/06* (2013.01); *F01L 1/047* (2013.01); *F01L 2001/0537* (2013.01); *F01L 2820/041* (2013.01); *F01L 2820/042* (2013.01); *G01D 5/2457* (2013.01)

(58) Field of Classification Search
CPC ............ F01L 1/34; G01B 21/16; G01B 21/22; G01D 5/147; G01D 5/2457; G01M 15/06
USPC ......................................... 73/114.26–114.29
See application file for complete search history.

(56) References Cited

U.S. PATENT DOCUMENTS

| 4,483,184 A | * | 11/1984 | Kunzfeld | ............ G01M 15/046 73/114.28 |
|---|---|---|---|---|
| 5,462,022 A | * | 10/1995 | Ushida | .................... F01L 1/344 123/90.17 |

(Continued)

*Primary Examiner* — Freddie Kirkland, III
(74) *Attorney, Agent, or Firm* — Norton Rose Fulbright US LLP; Gerard Messina

(57) ABSTRACT

A device for ascertaining a camshaft position and a phase of an internal-combustion engine having multiple cylinders, including a first position sensor wheel having multiple teeth on its circumference and rotatably and fixedly connected to an engine camshaft; a first position sensor for detecting a tooth flank position of the first wheel; a transmission connecting the camshaft to a crankshaft; a second position sensor wheel having at least one tooth on its circumference and being connected to the transmission so that it is synchronously driven with the camshaft, and a second position sensor for detecting a tooth flank position of the second wheel. For ascertaining a camshaft position and a phase of an engine with this device, a camshaft position is assigned to a position of a tooth flank of the first wheel and a phase of the engine is assigned to a tooth flank position of the second wheel.

23 Claims, 2 Drawing Sheets

(56) References Cited

U.S. PATENT DOCUMENTS

| | | | | |
|---|---|---|---|---|
| 5,463,898 A * | 11/1995 | Blander | ............ | F01L 1/46 |
| | | | | 73/114.26 |
| 5,522,352 A * | 6/1996 | Adachi | ............ | F01L 1/34406 |
| | | | | 123/90.15 |
| 5,769,044 A * | 6/1998 | Moriya | ............ | F01L 1/34403 |
| | | | | 123/90.17 |
| 5,924,397 A * | 7/1999 | Moriya | ............ | F01L 1/34406 |
| | | | | 123/90.17 |
| 6,302,085 B1 * | 10/2001 | Sekine | ............ | F02D 41/009 |
| | | | | 123/406.18 |
| 6,474,278 B1 * | 11/2002 | Davis | ............ | F01L 1/34 |
| | | | | 123/90.15 |
| 6,530,351 B2 * | 3/2003 | Mikame | ............ | F01L 1/34 |
| | | | | 123/339.24 |
| 6,588,404 B1 * | 7/2003 | Mathews | ............ | F02D 41/222 |
| | | | | 123/406.18 |
| 6,843,214 B1 * | 1/2005 | Herrin | ............ | F01L 1/022 |
| | | | | 123/90.15 |
| 7,146,267 B2 * | 12/2006 | Sawada | ............ | F01L 1/08 |
| | | | | 123/90.15 |
| 7,198,012 B2 * | 4/2007 | Suga | ............ | F01L 1/34 |
| | | | | 123/90.15 |
| 7,661,297 B2 * | 2/2010 | Steinruecken | ............ | F01L 1/34 |
| | | | | 73/114.27 |
| 7,757,546 B2 * | 7/2010 | Gray | ............ | F01L 1/02 |
| | | | | 73/114.26 |
| 7,762,222 B2 * | 7/2010 | Tanaka | ............ | F01L 1/34 |
| | | | | 123/90.15 |
| 9,240,115 B2 * | 1/2016 | Omura | ............ | G01M 13/023 |
| 2003/0111058 A1 * | 6/2003 | Mathews | ............ | F02D 41/009 |
| | | | | 123/479 |
| 2005/0212509 A1 * | 9/2005 | Asama | ............ | G01D 5/2492 |
| | | | | 324/207.2 |

* cited by examiner

METHOD AND DEVICE FOR ASCERTAINING A POSITION OF A CAMSHAFT AND A PHASE OF AN INTERNAL COMBUSTION ENGINE

RELATED APPLICATION INFORMATION

The present application claims priority to and the benefit of German patent application no. 10 2013 214 303.6, which was filed in Germany on Jul. 22, 2013, the disclosure of which is incorporated herein by reference.

FIELD OF THE INVENTION

The present invention relates to a device for ascertaining a position of a camshaft and a phase of an internal combustion engine. In addition, it also relates to a method for ascertaining a position of a camshaft and a phase of an internal combustion engine with the aid of the device according to the present invention. The present invention also relates to a computer program, which executes all steps of the method according to the present invention when the computer program is running on an arithmetic unit. Finally, the present invention relates to a computer program product having program code, which is stored on a machine-readable carrier for carrying out the method when the program is executed on a computer or a control unit.

BACKGROUND INFORMATION

Internal combustion engines, in which the injection control is not mechanically linked to the engine position, also require a phase sensor in addition to the crankshaft angle sensor on the crankshaft, the phase sensor being in synchronization with the camshafts, with which it is possible to determine which of the cylinders next to reach top dead center (TDC) is in a power stroke at the moment. This is known as the synchronization function. To be able to carry out the synchronization function as rapidly as possible, these sensor wheels are configured as fast-start sensor wheels, i.e., as sensor wheels with which a unique position is recognizable after an angle of rotation of approximately 90 degrees (=180 degrees crankshaft). A fast-start capability of the internal combustion engine is ensured in this way. In the event of a failure of the crankshaft sensor, an emergency operation capability or an emergency operation functionality of the internal combustion engine is ensured, in that the crankshaft angle is made available via the camshaft signal. The camshaft signal must therefore be analyzable exclusively on the basis of the time stamp of the camshaft flanks and must ideally have one tooth flank per cylinder of the internal combustion engine, each being the same distance from top dead center (TDC) of the cylinder. In internal combustion engines having camshaft adjustment, the prevailing positions of the camshafts are additionally ascertained by comparing the position of the equidistant tooth flanks on the camshaft sensor wheels, in relation to the crankshaft. This is known as ascertaining the camshaft adjustment position.

In today's camshaft position sensor wheels, these four functions are implemented in a single sensor wheel configuration with corresponding compromises. In fast-start sensor wheels for diesel engines and gasoline engines, at most four equidistant tooth flanks per camshaft revolution are available for ascertaining the camshaft adjustment position. During emergency operation, only these four flanks are utilized with conventional systems since the use of additional active tooth flanks would bring a disproportionate increase in system complexity in comparison with the benefits. In 4-cylinder engines, one item of camshaft position information is thus available per cylinder. However, camshaft position information is not evenly distributed in engines having 3, 6 or 8 cylinders, which entails an increased tolerance in the accuracy of the calculated camshaft position and thus in the filling of the cylinder and in the exhaust gases of the internal combustion engine during both normal operation and emergency operation. So-called Z+1 camshaft position sensor wheels utilize one active tooth flank per cylinder of the internal combustion engine and one additional active tooth flank for ascertaining the phase information of the internal combustion engine. These sensor wheels represent the optimized emergency operation capability but are not suitable for a fast start. They offer only one item of position information per cylinder in the distribution of the camshaft adjustment position information.

SUMMARY OF THE INVENTION

The device according to the present invention for ascertaining a position of a camshaft and a phase of an internal combustion engine, in particular an internal combustion engine, which includes a crankshaft sensor wheel, itself includes a first position sensor wheel having multiple teeth on its circumference. This device is connected in a rotatably fixed manner to a camshaft on an internal combustion engine having multiple cylinders. In addition, it has a first position sensor, which is configured for detecting a position of a tooth flank of the first position sensor wheel. A transmission connects the camshaft to a crankshaft of the internal combustion engine. A second position sensor wheel has on its circumference at least one tooth and is connected to the transmission in such a way that it is driven in synchronization with the camshaft. A second position sensor is configured for detecting a position on a tooth flank of the second position sensor wheel.

In the device according to the present invention, the first position sensor wheel supplies the position of the camshaft for regulating the position of the camshaft. It has a number of teeth, which may be on its circumference, this number being at least 1 greater than or at least 1 smaller than the number of the cylinders of the internal combustion engine operated by the camshaft assigned to the first position sensor wheel. This may be in particular an n*Z+1 or an n*Z−1 camshaft position sensor wheel, where n corresponds to the maximum number of desired active tooth flanks of the camshaft sensor wheel per cylinder, and Z corresponds to the number of cylinders operated by the respective camshaft. However, this may also be a camshaft position sensor wheel whose geometry is otherwise optimized for detection of the camshaft adjustment position.

In the device according to the present invention, the second position sensor wheel may be used to determine the phases of the internal combustion engine for synchronization of its camshafts and ensures the emergency operation capability and fast-start capability of the internal combustion engine. It need not be adjustable with respect to the crankshaft, so that these functions may definitely be represented as more robust than those with a sensor wheel mounted on the camshaft and influenced by the adjustment of the camshaft position. However, the second position sensor wheel is not a crankshaft sensor wheel of the internal combustion engine. A good fast-start capability may be achieved by the fact that a definite camshaft position is recognizable on the second position sensor wheel due to a unique configuration of its tooth flanks after essentially a 90° angle of rotation (=180° crankshaft).

A camshaft position is assigned to a position on a tooth flank of the first position sensor wheel in the method according to the present invention for ascertaining a position of a camshaft and a phase of an internal combustion engine with the aid of the device according to the present invention, and a phase of the internal combustion engine is assigned to a position of a tooth flank of the second position sensor wheel. A phase of the internal combustion engine may be also assigned to a pattern of the tooth flanks of the second position sensor wheel. To achieve a good fast-start capability of the internal combustion engine, the tooth flanks of the second position sensor wheel may be distributed in such a way that each pattern formed therefrom may be assigned to a phase of the internal combustion engine within an angle of rotation of 90°. The second position sensor wheel therefore does not have more active tooth flanks than a traditional fast-start camshaft position sensor wheel.

During emergency operation of the internal combustion engine, a position of the crankshaft of the internal combustion engine may advantageously be ascertained from the signal of the second position sensor, a higher reliability in particular being achievable here. If it is certain that the camshaft of the first position sensor wheel is in a reference position, then a position of the crankshaft of the internal combustion engine may advantageously be ascertained at a higher evaluation frequency from the signal of the first position sensor during emergency operation of the internal combustion engine.

The computer program according to the present invention executes all steps of the method according to the present invention when it is run on an arithmetic unit or a control unit. To permit implementation of the method according to the present invention in an existing control unit without having to make any structural changes in it, the computer program product according to the present invention is provided with program code which is stored on a machine-readable carrier and is used to carry out the method according to the present invention when the program is executed on a computer or a control unit.

One exemplary embodiment of the present invention is schematically represented in the drawings and explained in greater detail in the following description.

DETAILED DESCRIPTION

Figure 1:
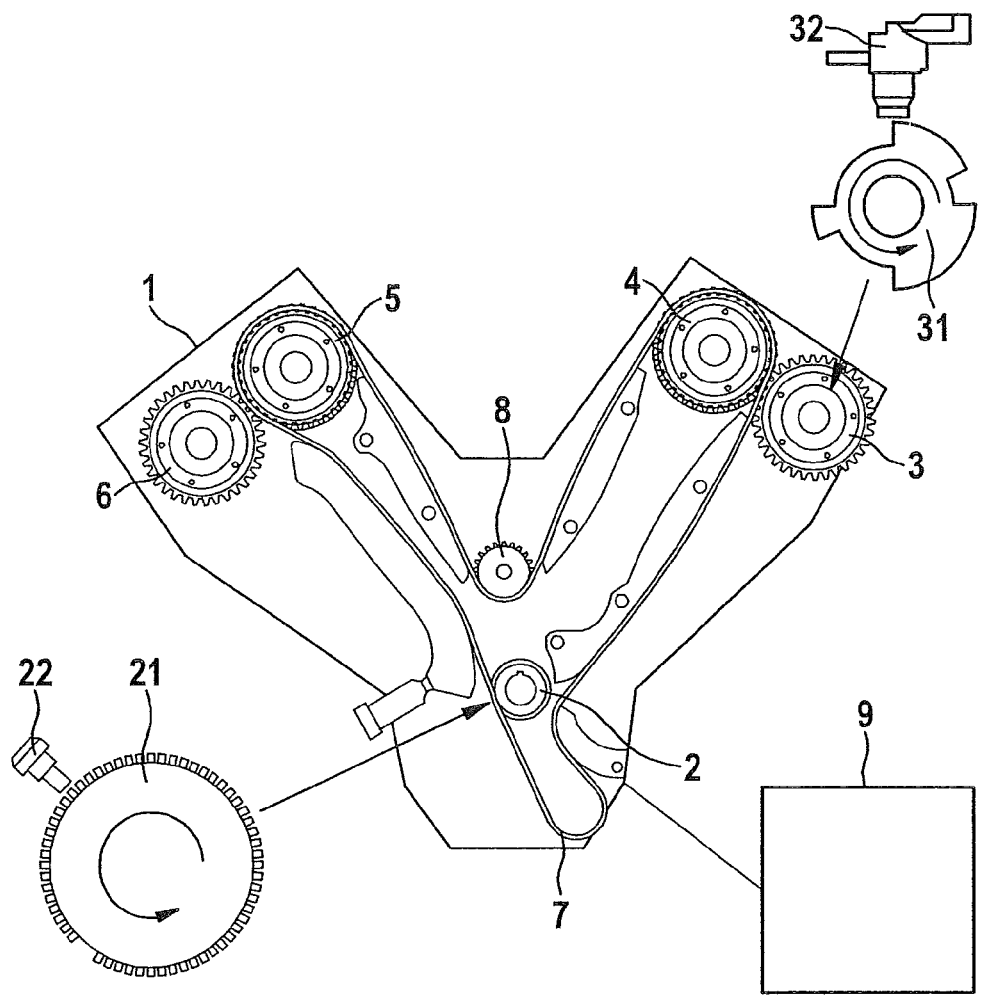
FIG. 1 schematically shows a device for ascertaining a position of a camshaft and a phase of an internal combustion engine according to the related art.
Figure 2:
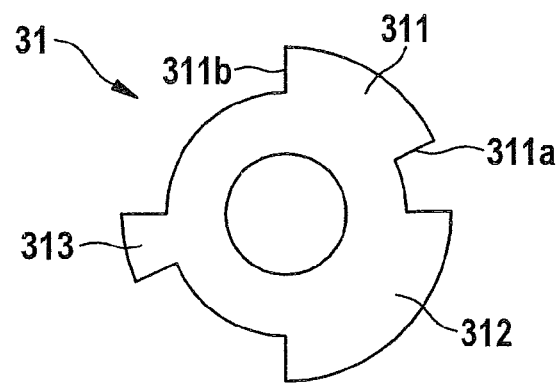
FIG. 2 shows a fast-start sensor wheel, which is used in the device according to FIG. 1.

FIG. 1 shows a traditional device for ascertaining a position of a camshaft and a phase of an internal combustion engine. An internal combustion engine 1, configured as a V engine, includes a crankshaft 2, on which a crankshaft sensor wheel 21 is situated. This is configured as a 60-2 sensor wheel. A crankshaft angle sensor 22 detects the position of the tooth flanks of crankshaft sensor wheel 21 to determine the crankshaft angle. Internal combustion engine 1 has four camshafts 3, 4, 5, 6, which are connected by a chain drive or a belt drive as transmission 7 connected to crankshaft 2. Due to a transmission ratio of 2:1, each camshaft 3, 4, 5, 6 completes one revolution per two revolutions of crankshaft 2. Transmission 7 is guided via a deflection roller 8. A control unit 9 is connected to internal combustion engine 1. A camshaft position sensor wheel is situated on each camshaft 3, 4, 5, 6. This is described below on the basis of camshaft position sensor wheel 31 on one of camshafts 3. A position sensor 32 is configured for detecting the position of the tooth flanks of camshaft position sensor wheel 31. This is illustrated in FIG. 2. It has three teeth 311, 312, 313 on its circumference. Each tooth 311, 312, 313 has one tooth flank in the direction of rotation of camshaft position sensor wheel 31 and another tooth flank opposite the direction of rotation. In the case of tooth 311, these are tooth flanks 311a, 311b. Camshaft position sensor wheel 31 is used as a fast-start sensor wheel. For this purpose, all tooth flanks, whose position is read out by position sensor 32, are used as active flanks.

Figure 3:
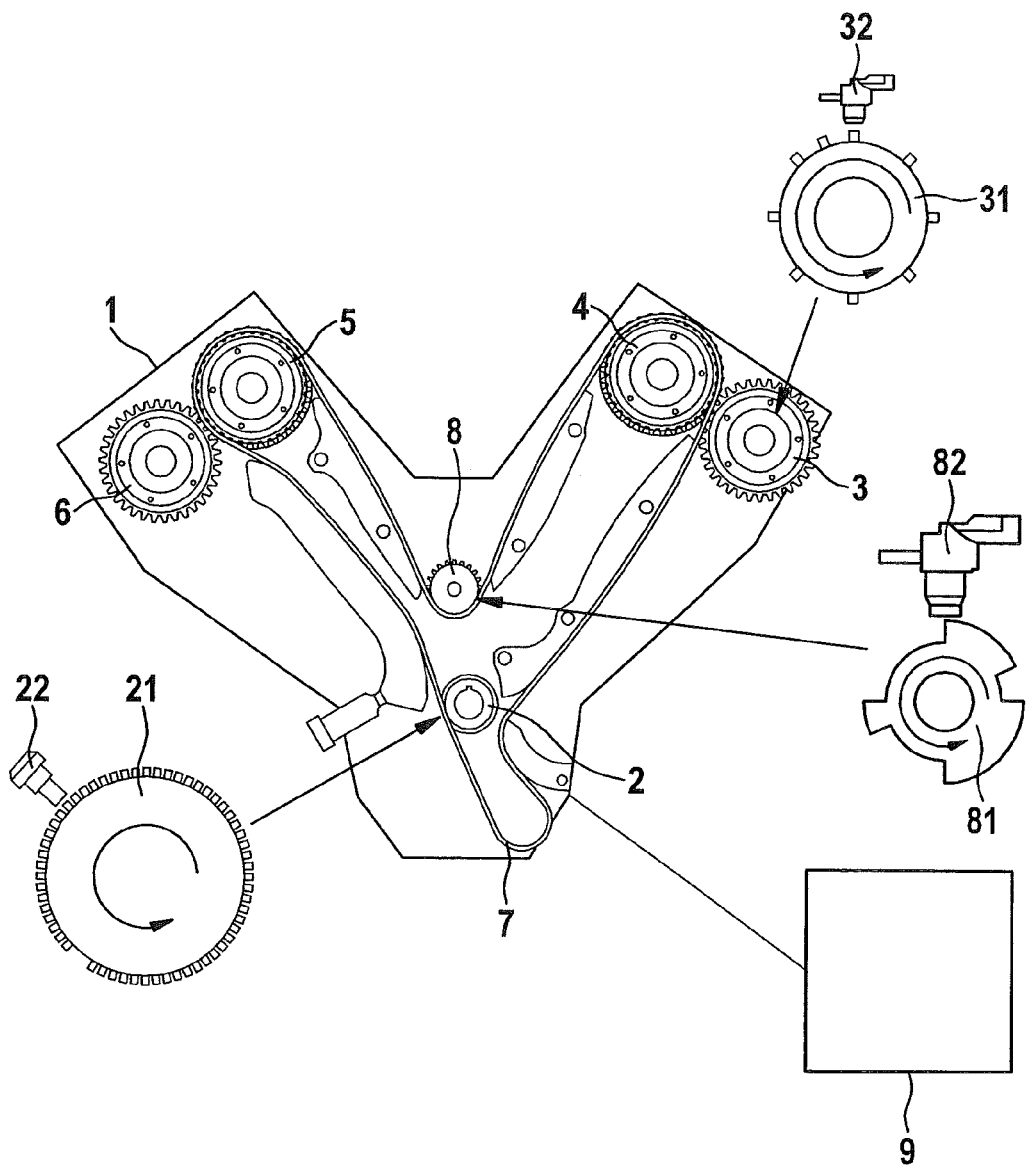
FIG. 3 shows a device for ascertaining a position of a camshaft and a phase of an internal combustion engine according to one specific embodiment of the present invention.

As illustrated in FIG. 3, a device for ascertaining a position of a camshaft and a phase of an internal combustion engine according to one specific embodiment of the present invention differs from the traditional device in that another position sensor wheel 81 is situated on deflection roller 8. It is connected to transmission 7 in such a way that it is driven in synchronization with camshafts 3, 4, 5, 6, via deflection roller 8. It is configured in the same form as camshaft position sensor wheel 31 of the traditional device. The position of its tooth flanks is detected with the aid of a position sensor 82. In the device according to the present invention, camshaft position sensor wheel 31 on one of camshafts 3 is replaced by an n*Z+1 position sensor wheel 31, where n corresponds to the maximum number of desired active flanks per cylinder, and Z corresponds to the number of cylinders operated by the respective camshaft. Nine active flanks of this position sensor wheel 31 are detected with the aid of a position sensor 32. This camshaft position sensor wheel 31 is used only for detecting the position of the camshaft in the device according to the present invention. The phase information and the assurance of fast-start and emergency operation capability of internal combustion engine 1 are ensured via additional position sensor wheel 81 on deflection roller 8. By using a fast-start-capable position sensor wheel 81 here, it is possible to ensure the fast-start capability of internal combustion engine 1, while at the same time achieving an increased accuracy of camshaft adjustment position regulation of internal combustion engine 1 due to an improved camshaft adjustment position detection, i.e., a higher sampling rate in comparison with the traditional device according to FIG. 1 with the aid of N*Z+1 position sensor wheel 31.

What is claimed is:

1. A device for ascertaining a position of a camshaft and a phase of an internal combustion engine including multiple cylinders, the device comprising:
 a first position sensor wheel, which has multiple teeth on its circumference and is connected in a rotatably fixed manner to the camshaft of the internal combustion engine;
 a first position sensor to detect a position of a tooth flank of the first position sensor wheel;
 a second position sensor wheel, which has at least one tooth on its circumference, and which is connected to a rotating component of a transmission that connects a crankshaft of the internal combustion engine to the camshaft, so that the second position sensor wheel is driven in synchronization with the camshaft; and a second position sensor to detect a position of a tooth flank of the second position sensor wheel.

2. The device of claim 1, wherein the first position sensor wheel has more teeth on its circumference than the second position sensor wheel.

3. The device of claim 1, wherein the first position sensor wheel has on its circumference a number of teeth which is larger by at least one or smaller by at least one than the number of cylinders of the internal combustion engine operated by the camshaft assigned to the first position sensor wheel.

4. The device of claim 1, wherein the second position sensor wheel is not adjustable with respect to the crankshaft.

5. The device of claim 1, further comprising a third sensor wheel connected in a rotatably fixed manner to the crankshaft of the internal combustion engine.

6. The device of claim 1, wherein the rotating component is a deflection roller of the transmission.

7. The device of claim 1, wherein the rotating component is located between the camshaft and the crankshaft along at least one of: a chain drive of the transmission, or a belt drive of the transmission.

8. The device of claim 1, wherein the position of the camshaft is ascertained based on a signal from the first position sensor representing the detected position of the tooth flank of the first position sensor wheel, and the phase of the internal combustion engine is ascertained based on a signal from the second position sensor representing the detected position of the tooth flank of the second position sensor wheel.

9. The device of claim 1, further comprising a control unit to ascertain the position of the camshaft based on a signal from the first position sensor representing the detected position of the tooth flank of the first position sensor wheel, and to ascertain the phase of the internal combustion engine based on a signal from the second position sensor representing the detected position of the tooth flank of the second position sensor wheel.

10. A method for ascertaining a position of a camshaft and a phase of an internal combustion engine including multiple cylinders, the method comprising:

connecting a first position sensor wheel in a rotatably fixed manner to the camshaft of the internal combustion engine, the first position sensor wheel including multiple teeth on its circumference; and connecting a second position sensor wheel to a rotating component of a transmission that connects a crankshaft of the internal combustion engine to the camshaft, so that the second position sensor wheel is driven in synchronization with the camshaft, the second position sensor wheel including at least one tooth on its circumference;

detecting the position of the camshaft based on a signal from a first position sensor configured to detect a position of a tooth flank of the first position sensor wheel; and detecting the phase of the internal combustion engine based on a signal from a second position sensor configured to detect a position of a tooth flank of the second position sensor wheel.

11. The method of claim 10, wherein one phase of the internal combustion engine is assigned to a pattern of the tooth flanks of the second position sensor wheel.

12. The method of claim 11, wherein the tooth flanks of the second position sensor wheel are distributed so that each pattern formed therefrom is assignable to one phase of the internal combustion engine within an angle of rotation of 90°.

13. The method of claim 10, wherein one position of the crankshaft is ascertained from the signal of the second position sensor during emergency operation of the internal combustion engine.

14. The method of claim 10, wherein the first position sensor wheel has more teeth on its circumference than the second position sensor wheel.

15. The method of claim 10, wherein the rotating component is a deflection roller of the transmission.

16. The method of claim 10, wherein the rotating component is located between the camshaft and the crankshaft along at least one of: a chain drive of the transmission, or a belt drive of the transmission.

17. A non-transitory machine-readable storage medium having program instructions, which when executed by a processor perform a method for ascertaining a position of a camshaft and a phase of an internal combustion engine including multiple cylinders, the method comprising:

assigning the camshaft position to a position of a tooth flank of a first position sensor wheel connected in a rotatably fixed manner to the camshaft of the internal combustion engine, the first position sensor wheel including multiple teeth on its circumference;

assigning the phase of the internal combustion engine to a position of a tooth flank of a second position sensor wheel connected to a rotating component of a transmission that connects a crankshaft of the internal combustion engine to the camshaft, so that the second position sensor wheel is driven in synchronization with the camshaft, the second position sensor wheel including at least one tooth on its circumference;

detecting the position of the camshaft based on a signal from a first position sensor configured to detect the position of the tooth flank of the first position sensor wheel; and detecting the phase of the internal combustion engine based on a signal from a second position sensor configured to detect the position of the tooth flank of the second position sensor wheel.

18. The non-transitory machine-readable storage medium of claim 17, wherein the first position sensor wheel has more teeth on its circumference than the second position sensor wheel.

19. The non-transitory machine-readable storage medium of claim 17, wherein the first position sensor wheel has on its circumference a number of teeth which is larger by at least one or smaller by at least one than the number of cylinders of the internal combustion engine operated by the camshaft assigned to the first position sensor wheel.

20. The non-transitory machine-readable storage medium of claim 17, wherein the second position sensor wheel is not adjustable with respect to the crankshaft.

21. The non-transitory machine-readable storage medium of claim 17, wherein the internal combustion engine includes a crankshaft sensor wheel.

22. The non-transitory machine-readable storage medium of claim 17, wherein the rotating component is a deflection roller of the transmission.

23. The non-transitory machine-readable storage medium of claim 17, wherein the rotating component is located between the camshaft and the crankshaft along at least one of: a chain drive of the transmission, or a belt drive of the transmission.

* * * * *